United States Patent
Yokoyama et al.

(10) Patent No.: US 12,139,037 B2
(45) Date of Patent: *Nov. 12, 2024

(54) CHARGE CONTROL SYSTEM, CHARGE CONTROL DEVICE, AND RECORDING MEDIUM

(71) Applicant: TOYOTA JIDOSHA KABUSHIKI KAISHA, Toyota (JP)

(72) Inventors: Daiki Yokoyama, Gotembe (JP); Daiki Kawachino, Sunto-gun (JP); Shota Tsukamoto, Susono (JP); Rie Yayabe, Susono (JP); Masaaki Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

This patent is subject to a terminal disclaimer.

(21) Appl. No.: 17/481,969

(22) Filed: Sep. 22, 2021

(65) Prior Publication Data

US 2022/0144124 A1     May 12, 2022

(30) Foreign Application Priority Data

Nov. 12, 2020  (JP) ................. 2020-188688

(51) Int. Cl.
    *B60L 53/68*      (2019.01)
    *B60L 53/66*      (2019.01)
    *H02J 7/00*       (2006.01)

(52) U.S. Cl.
    CPC ............. *B60L 53/68* (2019.02); *B60L 53/665* (2019.02); *H02J 7/0071* (2020.01); *H02J 7/00712* (2020.01)

(58) Field of Classification Search
    CPC ...................................................... B60L 53/68
    (Continued)

(56) References Cited

U.S. PATENT DOCUMENTS

| 6,420,978 | B1 | 7/2002 | Shinada |
| 8,078,330 | B2 | 12/2011 | Brickfield |

(Continued)

FOREIGN PATENT DOCUMENTS

| EP | 3751466 A1 | 12/2020 |
| JP | 2012-39706 A | 2/2012 |

(Continued)

OTHER PUBLICATIONS

Office Action mailed Feb. 15, 2024, in co-pending U.S. Appl. No. 17/481,969.

(Continued)

*Primary Examiner* — Yalkew Fantu
(74) *Attorney, Agent, or Firm* — Oblon, McClelland, Maier & Neustadt, L.L.P.

(57) ABSTRACT

A charge control system includes: a charging apparatus including a first processor to cause the charging apparatus to store electric power to be supplied to at least one preset facility; a facility server provided in the facility; and a charge control device including a second processor to acquire facility schedule information regarding a future schedule of the facility from the facility server, calculate an amount of electric power to be supplied to the facility based on a schedule of opening and closure of the facility included in the facility schedule information, and perform charging control for the charging apparatus based on the calculated amount of electric power.

6 Claims, 2 Drawing Sheets

(58) Field of Classification Search
USPC .......................................................... 320/109
See application file for complete search history.

(56) References Cited

U.S. PATENT DOCUMENTS

| | | | |
|---|---|---|---|
| 8,666,666 | B2 | 3/2014 | Bassa |
| 8,798,852 | B1* | 8/2014 | Chen ................. G06F 21/44 |
| | | | 701/32.7 |
| 9,222,984 | B2 | 12/2015 | Iwasaki et al. |
| 9,387,772 | B2 | 7/2016 | Usuki |
| 9,751,418 | B2 | 9/2017 | Nyu |
| 10,309,329 | B2 | 6/2019 | Tsunoda |
| 11,015,542 | B2 | 5/2021 | Aoki |
| 11,034,344 | B2 | 6/2021 | Endo |
| 11,214,166 | B2 | 1/2022 | Ono |
| 11,339,734 | B2 | 5/2022 | Muta |
| 11,374,415 | B2 | 6/2022 | Schweitzer et al. |
| 11,433,871 | B2 | 9/2022 | Furuya |
| 11,668,481 | B2 | 6/2023 | Granger |
| 11,868,144 | B2 | 1/2024 | Wake |
| 2006/0168951 | A1 | 8/2006 | Opris |
| 2006/0168952 | A1 | 8/2006 | Opris |
| 2008/0281732 | A1* | 11/2008 | Yamada ............... H01M 10/44 |
| | | | 705/308 |
| 2011/0202217 | A1* | 8/2011 | Kempton ............... B60L 53/65 |
| | | | 320/109 |
| 2013/0057211 | A1 | 3/2013 | Kuribayashi |
| 2013/0213020 | A1 | 8/2013 | Ishikawa |
| 2013/0218447 | A1 | 8/2013 | Mayinger |
| 2014/0253037 | A1 | 9/2014 | Yano |
| 2015/0039391 | A1* | 2/2015 | Hershkovitz ......... G06Q 10/04 |
| | | | 705/7.31 |
| 2015/0134142 | A1* | 5/2015 | Taylor .................. B60L 3/0046 |
| | | | 701/1 |
| 2020/0139957 | A1 | 5/2020 | Muta |
| 2020/0231058 | A1 | 7/2020 | Hishida |
| 2022/0005113 | A1 | 1/2022 | Kimura |
| 2022/0091619 | A1 | 3/2022 | Wake |
| 2022/0144119 | A1 | 5/2022 | Yokoyama et al. |
| 2022/0144124 | A1 | 5/2022 | Yokoyama et al. |
| 2022/0149614 | A1 | 5/2022 | Yokoyama et al. |
| 2022/0161674 | A1 | 5/2022 | Yokoyama |
| 2022/0164721 | A1 | 5/2022 | Yokoyama et al. |
| 2022/0169136 | A1 | 6/2022 | Yokoyama |
| 2023/0071267 | A1 | 3/2023 | Fujiwara |

FOREIGN PATENT DOCUMENTS

| | | |
|---|---|---|
| JP | 2013-69084 A | 4/2013 |
| JP | 2016-173689 A | 9/2016 |
| JP | 2018-196231 A1 | 12/2018 |
| JP | 2019-21016 A | 2/2019 |

OTHER PUBLICATIONS

Notice of Allowance mailed May 28, 2024, in co-pending U.S. Appl. No. 17/481,969.
Final Office Action mailed May 14, 2024, in co-pending U.S. Appl. No. 17/452,434.
Office Action mailed Dec. 20, 2023, in co-pending U.S. Appl. No. 17/452,434.
M. Ghoneim and S.M. Hamed, "Towards a Smart Sustainable City: Air Pollution Detection and Control using Internet of Things," 2019 5th International Conference on Optimization and Applications (ICOA), Kenitra, Morocco, 2019, pp. 1-6, doi: 10.1109/ICOA .2019.8727690.
M. Akcin, A Kaygusuz, A Karabiber, S. Alagoz, B.B. Alagoz and C. Keles, "Opportunities for energy efficiency in smart cities," 2016 4th International Istanbul Smart Grid Congress and Fair (ICSG), Istanbul, Turkey, 2016, pp. 1-5, doi: 10.1109/SGCF .2016.7492425.
Office Action mailed Mar. 4, 2024, in co-pending U.S. Appl. No. 17/451,867.
Notice of Allowance mailed May 29, 2024, in co-pending U.S. Appl. No. 17/451,867.
Office Action mailed Jul. 19, 2024 in co-pending U.S. Appl. No. 17/451,867.
Notice of Allowance dated Aug. 28, 2024, issued in corresponding U.S. Appl. No. 17/451,867.
Office Action mailed Jul. 19, 2024 in co-pending U.S. Appl. No. 17/507,062.

* cited by examiner

CHARGE CONTROL SYSTEM, CHARGE CONTROL DEVICE, AND RECORDING MEDIUM

CROSS-REFERENCE TO RELATED APPLICATION(S)

The present application claims priority to and incorporates by reference the entire contents of Japanese Patent Application No. 2020-188688 filed in Japan on Nov. 12, 2020.

BACKGROUND

The present disclosure relates to a charge control system, a charge control device, and a recording medium.

There is known a technique of acquiring an operation schedule of a facility and determining a charging and discharging timing of a charging apparatus based on the operation schedule (see, for example, Japanese Laid-open Patent Publication No. 2012-39706).

SUMMARY

There is a need for providing a charge control system, a charge control device, and a recording medium storing a charge control program capable of appropriately controlling a charging apparatus even in a case where an unexpected situation occurs.

According to an embodiment, a charge control system includes: a charging apparatus including a first processor to cause the charging apparatus to store electric power to be supplied to at least one preset facility; a facility server provided in the facility; and a charge control device including a second processor to acquire facility schedule information regarding a future schedule of the facility from the facility server, calculate an amount of electric power to be supplied to the facility based on a schedule of opening and closure of the facility included in the facility schedule information, and perform charging control for the charging apparatus based on the calculated amount of electric power.

According to an embodiment, a charge control device includes a processor to: acquire facility schedule information regarding a future schedule of at least one facility from a facility server provided in the facility that is supplied with electric power from a charging apparatus; calculate an amount of electric power to be supplied to the facility based on a schedule of opening and closure of the facility included in the facility schedule information; and perform charge control for the charging apparatus based on the calculated amount of power.

According to an embodiment, a non-transitory computer-readable recording medium stores a charge control program that causes a processor to: acquire facility schedule information regarding a future schedule of at least one facility from a facility server provided in the facility that is supplied with electric power from a charging apparatus; calculate an amount of electric power to be supplied to the facility based on a schedule of opening and closure of the facility included in the facility schedule information; and perform charge control for the charging apparatus based on the calculated amount of power.

DETAILED DESCRIPTION

In the related art, for example, there has been a demand for a technique capable of appropriately controlling a charging apparatus even in a case where an unexpected situation occurs, such as a case where an infectious disease or the like occurs and a facility is closed (a school is closed).

A charge control system, a charge control device, and a charge control program according to an embodiment of the present disclosure will be described with reference to the drawings. The components in the following embodiment include those that can be easily replaced by those skilled in the art, or those that are substantially the same.

Charge Control System

A charge control system including a charge control device according to the embodiment will be described with reference to FIG. 1. The charge control system is for performing charge control for a charging apparatus that supplies electric power to a preset facility. The "preset facility" is a facility in which a large number of users stay or which is used by a large number of users, and to which electric power is supplied from the charging apparatus. Examples of the facility include public facilities such as schools, libraries, and community halls, railroad stations, subway stations, restaurants, food stores, and shopping centers.

Figure 1:
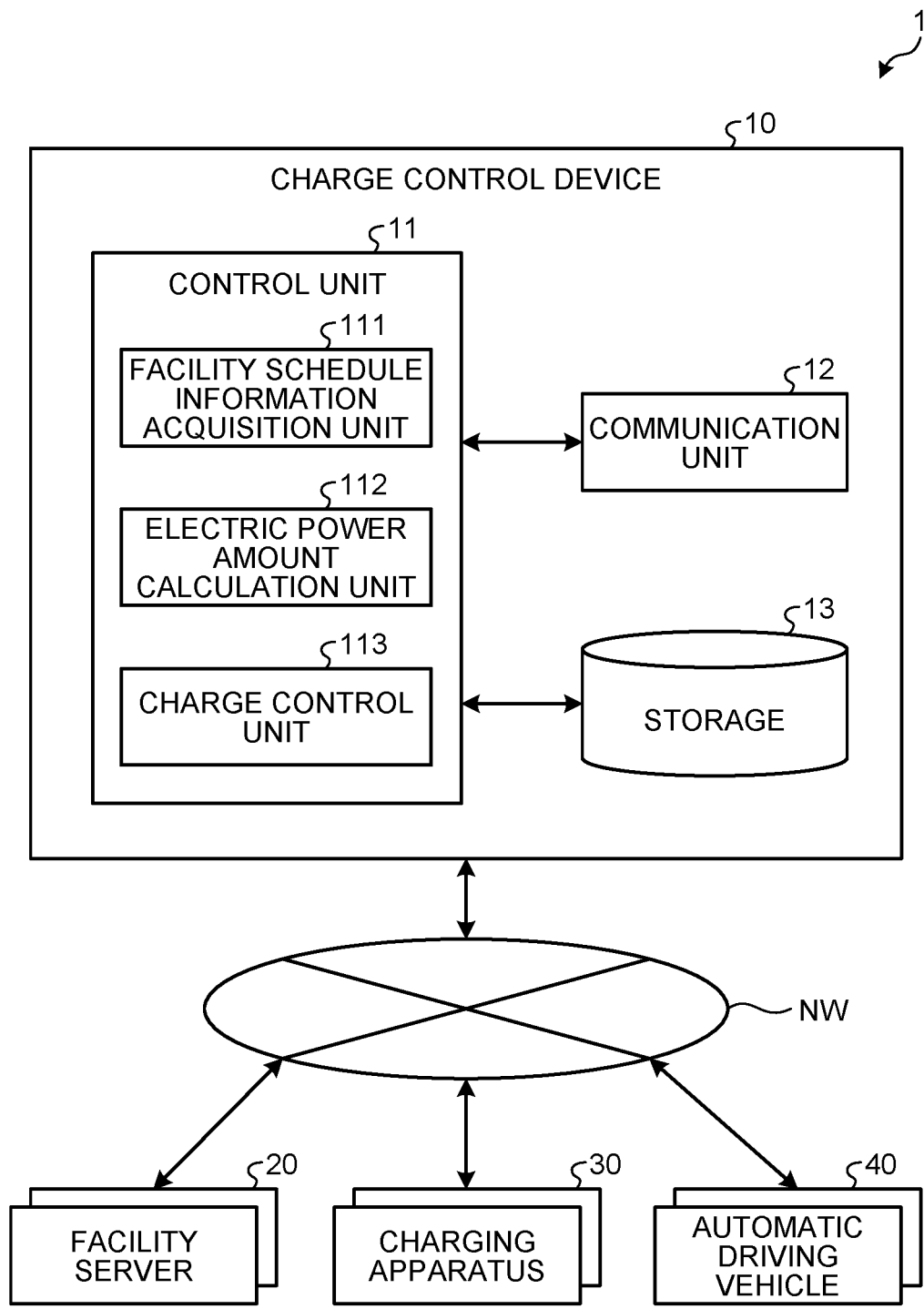
FIG. 1 is a block diagram illustrating details of each component of a charge control system according to an embodiment.

As illustrated in FIG. 1, a charge control system 1 includes a charge control device 10, facility servers 20 provided in a plurality of facilities, a plurality of charging apparatuses 30, and a plurality of automatic driving vehicles 40. The charge control device 10, the facility servers 20, the charging apparatuses 30, and the automatic driving vehicles 40 all have a communication function, and are configured to be able to communicate with each other through a network NW. The network NW includes, for example, the Internet line network, a mobile phone line network, and the like.

Charge Control Device

The charge control device 10 is provided inside the smart city or outside the smart city. This charge control device 10 is implemented by, for example, a general-purpose computer such as a workstation or a personal computer, for example.

As illustrated in FIG. 1, the charge control device 10 includes a control unit 11, a communication unit 12, and a storage 13. Specifically, the control unit 11 includes a processor including a central processing unit (CPU), a digital signal processor (DSP), or a field-programmable gate array (FPGA), and a memory (main storage) including a random access memory (RAM), a read only memory (ROM), or the like.

The control unit 11 loads a program stored in the storage 13 into the work area of the main storage and executes the program, and controls each of the components and the like through the execution of the program to implement functions that meet a predetermined purpose. The control unit 11 functions as a facility schedule information acquisition unit 111, an electric power amount calculation unit 112, and a charge control unit 113 through execution of a program stored in the storage 13.

The facility schedule information acquisition unit 111 acquires information regarding the future schedules of the facilities (hereinafter, referred to as "facility schedule information") from the facility servers 20. The facility schedule information includes, for example, a schedule of opening, a schedule of closure, an operating time (business hours), and the like of the each of the facilities. Note that the facility schedule information acquisition unit 111 may acquire the facility schedule information not only from the facility servers 20 but also from, for example, a terminal (for example, a smartphone, a tablet PC, etc.) of a user who uses a facility (or a guardian thereof), or may collect pieces of the facility schedule information from a social networking service (SNS) or the like.

The electric power amount calculation unit 112 calculates electric power amounts to be supplied to the facilities based on the schedules of opening and closure of the facilities included in the facility schedule information acquired by the facility schedule information acquisition unit 111. For example, the electric power amount calculation unit 112 can calculate each of the electric power amounts by multiplying the time during which the facility is open in a predetermined period of time (for example, one week) by a predetermined electric power amount per unit time. In addition, the electric power amount calculation unit 112 can calculate each of the electric power amount by, for example, subtracting the electric power amount corresponding to the time during which the facility is closed from the electric power amount for a predetermined period of time (for example, one week).

Here, for example, in a case where the automatic driving vehicles 40 are used as pick-up vehicles operated between the facilities and users' homes at normal times, or in a case where the automatic driving vehicles are used as emergency pick-up vehicles operated between the facilities that are closed at the time of occurrence of an infectious disease, a disaster, or the like and the users' homes, operation of the automatic driving vehicles 40 increases. Therefore, in such situations, the electric power amount calculation unit 112 calculates the electric power amounts in consideration of not only the electric power amounts to be supplied to the facilities but also the electric power amounts to be supplied to the automatic driving vehicles 40.

In this case, the electric power amount calculation unit 112 calculates the electric power amounts to be supplied to the facilities and the automatic driving vehicles 40 such that the electric power amounts to be supplied to the facilities and the electric power amounts to be supplied to the automatic driving vehicles 40 are in a predetermined ratio. Then, when the facility schedule information includes a schedule of closure of some of the facilities, the electric power amount calculation unit 112 calculates an electric power amounts to be supplied to the facilities and the automatic driving vehicles 40 such that the ratio of the electric power amount to be supplied to the facilities is small and the ratio of the electric power amount to be supplied to the automatic driving vehicles 40 is large with respect to the predetermined ratio. That is, the electric power amount calculation unit 112 calculates the electric power amount secured for the facilities to be smaller and calculates the electric power amount secured for the automatic driving vehicles 40 to be larger in accordance with the increase in demand for the automatic driving vehicles 40. Thus, it is possible to cope with an increase in electric power demand when the demand for the automatic driving vehicles 40 increases, and it is possible to prevent electricity shortage of the automatic driving vehicles 40.

Furthermore, in a case where the facility schedule information includes a schedule of closure of some of the facilities, the electric power amount calculation unit 112 may determine the predetermined ratio based on the number of facilities that are scheduled to be closed, the number of users of the facilities who are users of the facilities and who ride the automatic driving vehicles 40, and the accommodation capacities of the automatic driving vehicles 40. Thus, the amount of electric power to be secured for the facilities and the amount of electric power to be secured for the automatic driving vehicles 40 can be determined more accurately.

The charge control unit 113 performs charge control for the charging apparatuses 30 based on the electric power amounts calculated by the electric power amount calculation unit 112. The charge control unit 113 performs charge control for causing the charging apparatuses 30 to store the electric power equal to or more than the electric power amount calculated by the electric power amount calculation unit 112. A specific method of the charge control performed by the charge control unit 113 is not particularly limited, and for example, the charge control unit 113 may perform the charge control by determining, by the electric power amount calculation unit 112, the charge amount based on the electric power amounts calculated at predetermined periods and charging information acquired in advance from the charging apparatuses 30 (for example, charge capacity at the time, etc.), and transmitting a command to set the charge amount at the time or in the future to be larger or smaller to the charging apparatuses 30 according to the charge amount.

The communication unit 12 includes, for example, a local area network (LAN) interface board, a wireless communication circuit for wireless communication, and the like. The communication unit 12 is connected to the network NW such as the Internet, which is a public communication network, or the like. The communication unit 12 communicates with the facility servers 20, the charging apparatuses 30, and the automatic driving vehicles 40 by connecting to the network NW.

The storage 13 includes a recording medium such as an erasable programmable ROM (EPROM), a hard disk drive (HDD), or a removable medium. Examples of the removable medium include a disc recording medium such as a universal serial bus (USB) memory, a compact disc (CD), a digital versatile disc (DVD), and a Blu-ray (registered trademark) disc (BD). The storage 13 can store an operating system (OS), various programs, various tables, various databases, and the like. In addition, for example, the facility schedule information acquired by the facility schedule information acquisition unit 111, the electric power amount calculated by the electric power amount calculation unit 112, the charge amounts of the charging apparatuses 30 determined by the charge control unit 113, and the like are stored in the storage 13 as necessary.

Facility Server

The facility servers 20 are servers provided in the facilities and each implemented by, for example, a general-purpose computer such as a workstation or a personal computer, for example. Each of the facility servers 20 transmits the facility schedule information to the charge control device 10 occasionally or at predetermined periods. Furthermore, in a case where the facility is suddenly closed due to occurrence of, for example, an infectious disease, a disaster, or the like, the facility server 20 transmits facility schedule information to that effect to the charge control device 10 each time.

Charging Apparatus

The charging apparatuses 30 are for storing electric power to be supplied to the facilities and the automatic driving vehicles 40. These charging apparatuses 30 each are implemented by, for example, a general-purpose computer such as a workstation or a personal computer. In addition, the charging apparatuses 30 each incorporate a battery for storing electric power, a control mechanism for controlling charging and discharging of electric power, and the like. In addition, the charging apparatuses 30 transmit charging information regarding the charging apparatuses 30 at the time to the charge control device 10 occasionally or at predetermined periods.

Automatic Driving Vehicle

The automatic driving vehicles 40 are vehicles that can autonomously travel and that accommodates users of the facilities. Examples of the automatic driving vehicles 40 include pick-up vehicles operated between the facilities and the users' homes at normal times, and temporary pickup vehicles operated between the facilities and the users' homes when the facilities are unexpectedly closed due to occurrence of, for example, an infectious disease or a disaster. The automatic driving vehicles 40 are supplied with electric power from the charging apparatuses 30 through, for example, charging stands or the like.

Charge Control Method

Figure 2:
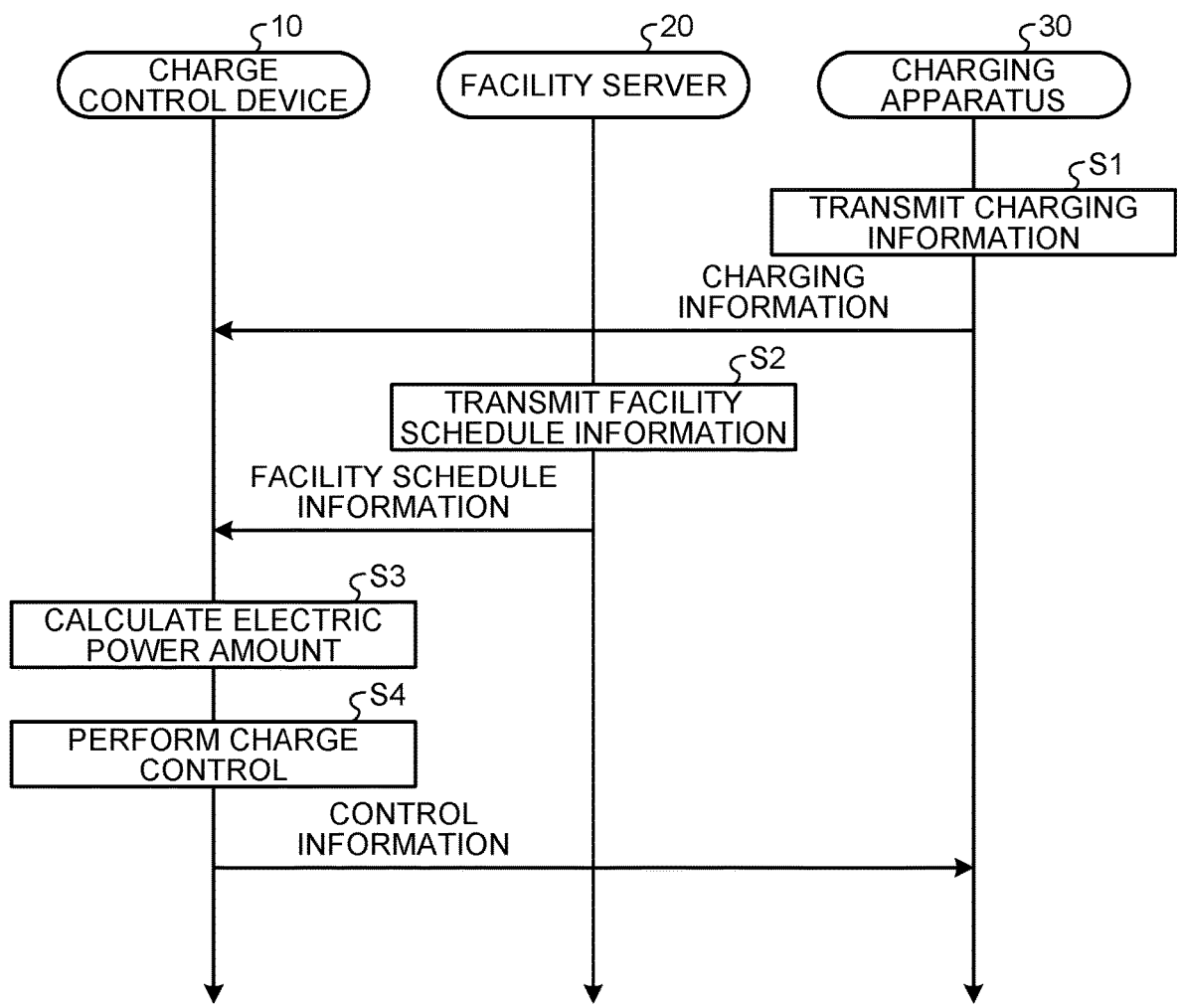
FIG. 2 is a flowchart illustrating an example of a charge control method performed by the charge control system according to the embodiment.

An example of a processing procedure of the charge control method performed by the charge control system 1 according to the embodiment will be described with reference to FIG. 2.

First, the charging apparatuses 30 transmit charging information to the charge control device 10 (step S1). Subsequently, the facility servers 20 transmit facility schedule information to the charge control device 10 (step S2). Note that the order of steps S1 and S2 may be reversed.

Subsequently, the electric power amount calculation unit 112 of the charge control device 10 calculates electric power amounts based on the facility schedule information (step S3). Subsequently, the charge control unit 113 performs charge control for the charging apparatuses 30 based on the electric power amounts calculated in step S3 (step S4). Thus, the processing of the charge control method is completed.

As described above, according to the charge control system, the charge control device, and the charge control program according to the embodiment, the electric power stored in the charging apparatuses 30 can be efficiently used when a city such as a smart city is operated. In addition, according to the charge control system, the charge control device, and the charge control program according to the embodiment, it is possible to cope with a change in electric power supply in an unexpected situation such as an infectious disease or a disaster.

For example, in a case where an infectious disease, a disaster, or the like occurs and the facilities are closed, the amount of electric power to be supplied to the facilities is not needed, and storage of electric power more than that to be consumed in the charging apparatuses 30 results in waste of electric power. In addition, if extra electric power is stored in the charging apparatuses 30 or a fully charged state continues for a long period of time, the batteries included in the charging apparatuses 30 may deteriorate.

On the other hand, according to the charge control system, the charge control device, and the charge control program stored in the recording medium according to the embodiment, when the facilities are closed, the charging amounts for the charging apparatuses 30 can be reduced, so that waste of electric power and deterioration of the batteries can be suppressed.

According to an embodiment, it is possible to efficiently use the electric power stored in a charging apparatus when a city such as a smart city is operated.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge control system comprising:
 a charging apparatus including a first processor configured to cause the charging apparatus to store electric power to be supplied to at least one preset facility;
 a facility server provided in the facility;
 a charge control device including a second processor configured to acquire facility schedule information regarding a future schedule of the facility from the facility server, calculate an amount of electric power to be supplied to the facility based on a schedule of opening and closure of the facility included in the facility schedule information, and perform charging control for the charging apparatus based on the calculated amount of electric power; and
 an automatic driving vehicle that is supplied with electric power from the charging apparatus and that accommodates a user of the facility,
 wherein the second processor is configured to:
  calculate amounts of electric power to be supplied to the facility and the automatic driving vehicle such that the amount of electric power to be supplied to the facility and the amount of electric power to be supplied to the automatic driving vehicle are in a predetermined ratio; and
  when the facility schedule information includes a schedule of closure of the facility, calculate the amounts of electric power to be supplied to the facility and the automatic driving vehicle such that a ratio of the amount of electric power to be supplied to the facility is small and a ratio of the amount of electric power to be supplied to the automatic driving vehicle is large, with respect to the predetermined ratio.

2. The charge control system according to claim 1, wherein the second processor is further configured to:
 when the facility schedule information includes a schedule of closure of a plurality of facilities, determine the predetermined ratio based on the number of the facilities scheduled to be closed, the number of users of the facilities who are users of the facilities and who ride the automatic driving vehicle, and an accommodation capacity of the automatic driving vehicle.

3. A charge control device comprising a processor configured to:
 acquire facility schedule information regarding a future schedule of at least one facility from a facility server provided in the facility that is supplied with electric power from a charging apparatus;
 calculate an amount of electric power to be supplied to the facility based on a schedule of opening and closure of the facility included in the facility schedule information;
 perform charge control for the charging apparatus based on the calculated amount of power;
 calculate amounts of electric power to be supplied to the facility and the automatic driving vehicle that is supplied with electric power from the charging apparatus and that accommodates at least one user of the facility such that the amount of electric power to be supplied to the facility and the amount of electric power to be supplied to the automatic driving vehicle are in a predetermined ratio; and
 when the facility schedule information includes a schedule of closure of the facility, calculate the amounts of electric power to be supplied to the facility and the automatic driving vehicle such that a ratio of the amount of electric power to be supplied to the facility is small and a ratio of the amount of electric power to be supplied to the automatic driving vehicle is large, with respect to the predetermined ratio.

4. The charge control device according to claim 3, wherein the processor is further configured to:
when the facility schedule information includes a schedule of closure of a plurality of facilities, determine the predetermined ratio based on the number of the facilities scheduled to be closed, the number of users of the facilities who are users of the facilities and who ride the automatic driving vehicle, and an accommodation capacity of the automatic driving vehicle.

5. A non-transitory computer-readable recording medium storing a charge control program that causes a processor to:
acquire facility schedule information regarding a future schedule of at least one facility from a facility server provided in the facility that is supplied with electric power from a charging apparatus;
calculate an amount of electric power to be supplied to the facility based on a schedule of opening and closure of the facility included in the facility schedule information;
perform charge control for the charging apparatus based on the calculated amount of power;
calculate amounts of electric power to be supplied to the facility and the automatic driving vehicle that is supplied with electric power from the charging apparatus and that accommodates at least one user of the facility such that the amount of electric power to be supplied to the facility and the amount of electric power to be supplied to the automatic driving vehicle are in a predetermined ratio; and
when the facility schedule information includes a schedule of closure of the facility, calculate the amounts of electric power to be supplied to the facility and the automatic driving vehicle such that a ratio of the amount of electric power to be supplied to the facility is small and a ratio of the amount of electric power to be supplied to the automatic driving vehicle is large, with respect to the predetermined ratio.

6. The non-transitory computer-readable recording medium according to claim 5, wherein the charge control program further causes the processor to:
when the facility schedule information includes a schedule of closure of a plurality of facilities, determine the predetermined ratio based on the number of the facilities scheduled to be closed, the number of users of the facilities who are users of the facilities and who ride the automatic driving vehicle, and an accommodation capacity of the automatic driving vehicle.

* * * * *

UNITED STATES PATENT AND TRADEMARK OFFICE
CERTIFICATE OF CORRECTION

PATENT NO. : 12,139,037 B2
APPLICATION NO. : 17/481969
DATED : November 12, 2024
INVENTOR(S) : Daiki Yokoyama et al.

Page 1 of 1

It is certified that error appears in the above-identified patent and that said Letters Patent is hereby corrected as shown below:

On the Title Page

Page 2, (56) References Cited, OTHER PUBLICATIONS, please change from "Office Action mailed Jul. 19, 2024 in co-pending U.S. Appl. No. 17/507,062" to --Office Action mailed Sept. 19, 2024 in co-pending U.S. Appl. No. 17/507,062--.

Signed and Sealed this
Second Day of September, 2025

Coke Morgan Stewart
*Acting Director of the United States Patent and Trademark Office*